Jan. 14, 1958     KEIGO KOBAYASHI     2,820,134
HEATING APPARATUS
Filed March 8, 1954
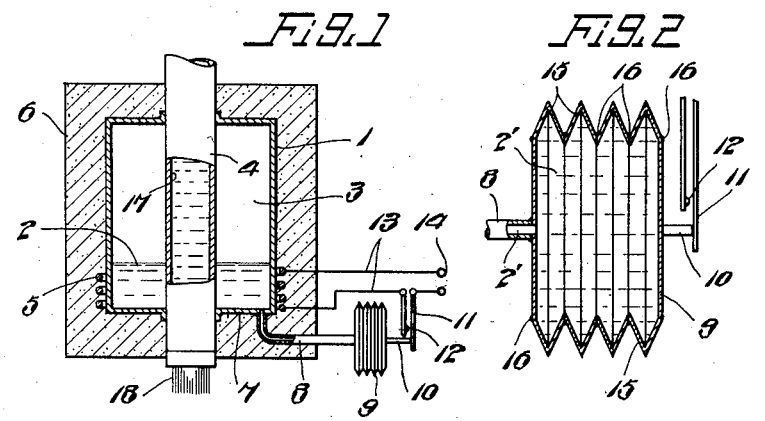
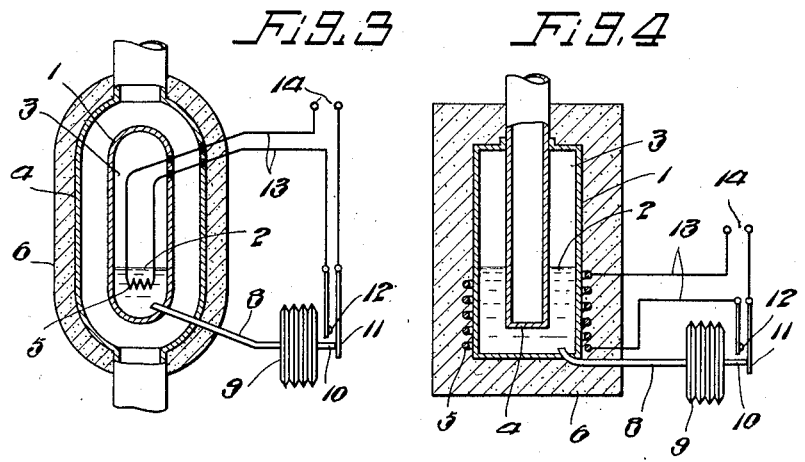
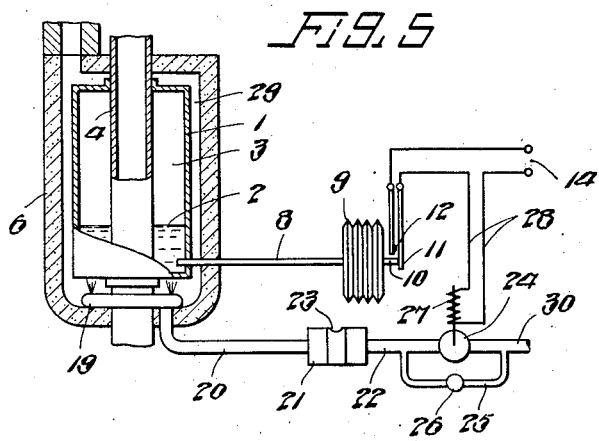

United States Patent Office 2,820,134
Patented Jan. 14, 1958

2,820,134
HEATING APPARATUS

Keigo Kobayashi, Tokyo, Japan

Application March 8, 1954, Serial No. 414,820

Claims priority, application Japan May 6, 1953

5 Claims. (Cl. 219—39)

This invention relates to heating apparatus and, more particularly to such devices for heating a substance in or passing through a receptacle at a constant temperature.

It is an object of this invention to provide a heating apparatus which is sensitive and positive in operation for temperature and maintaining it at the same condition, if heating any substance at a comparatively high constant desired.

Another object of this invention is to provide a heating and thermostatic apparatus which accurately maintains the substance to be heated at a constant high temperature, for instance 150° C., or higher, without injuring an elastic bellows which serve as a temperature compensating element, by such a high temperature.

In my prior application, Serial No. 292,926, filed June 10, 1952, now Patent No. 2,676,274, a thermostatic apparatus has been disclosed in which an element to be maintained at a constant temperature is mounted in a chamber surrounded by a sealed vessel in which vaporizable liquid medium and its vapor are simultaneously enclosed, and an elastic bellows, acting as a temperature compensating element, is attached to form one part of the sealed vessel where the vapor exists. In this apparatus, the elastic bellows is deformed according to the pressure change of the vapor in the sealed vessel, thereby controlling electric contacts to energize an electric heater which heats the liquid medium so as to maintain constant the temperature of the chamber surrounded by the sealed vessel.

The above described thermostat is intended to operate at a comparatively low temperature ranging from about 100° C. to room temperature. However, in the case of a comparatively higher temperature, such as higher than 150° C., it is recognized that thin metallic plates forming the elastic bellows are aged by the high temperature of the vapor to lose their elastic property and the welding flux interconnecting the metallic plates is melted at such high temperatures. Hence the elastic bellows cannot be used in such high temperature.

This invention intends to provide a heating apparatus which positively operates even at such higher temperature without these disadvantages.

In accordance with this invention, I provide a sealed vessel in which a liquid heating medium vaporized at a desired high temperature and its vapor are simultaneously enclosed, the air which formerly existed in the vessel being exhausted through a hole which is thereafter hermetically sealed. A receptacle is disposed in thermal relation with the sealed vessel for containing the substance to be heated. Heating means are also provided for heating the liquid heating medium of the sealed vessel. A fine pipe extends at one end into the sealed vessel through its wall and is immersed in the liquid heating medium, for instance, in the bottom or the lower part of the sealed vessel. Communicating with the other end of the fine pipe is an elastic bellows which is formed of a plurality of welded together, thin metallic plates. Accordingly, it is noted that the elastic bellows and the fine pipe are filled with liquid heating medium from the heating medium of the sealed vessel, and the pressure in the sealed vessel is always transmitted through the liquid heating medium in the fine pipe to the elastic bellows.

A pair of electric contacts is arranged with respect to the free end of the elastic bellows so that the former is controlled by the displacement of the latter according to the pressure variation in the sealed vessel.

As the heating means for heating the liquid heating medium in the sealed vessel, it is preferable to provide an electric heater which is inserted in an electric circuit including the electric contacts. The pressure variation caused by temperature changes in the sealed vessel is transmitted to the elastic bellows which operates the pair of electric contacts and the latter, in turn, controls the heater so as to compensate the temperature of the sealed vessel.

The temperature to be maintained constant in the sealed vessel may be changed as desired by adjusting the position of the electric contacts with respect to the free end of the elastic bellows. Accordingly, such adjusting means may easily be attached by those skilled in the art.

This invention will be more clearly understood by reference to the attached drawing showing, by way of example, some embodiments thereof.

Referring to the drawings:

Fig. 1 is a vertical sectional view of an arrangement showing one embodiment of this invention in which a sealed vessel has a tubular receptacle through which the substance to be heated passes, an electric heater circuit being attached thereto.

Fig. 2 is a vertical sectional view of an elastic bellows.

Fig. 3 is a vertical sectional view of a sealed vessel having a tubular receptacle which is arranged around the sealed vessel and through which the substance to be heated passes, an electric heater being immersed in the liquid heating medium of the sealed vessel.

Fig. 4 is a vertical sectional view of a sealed vessel having a tubular receptacle which is inserted into the sealed vessel and in which the substance to be heated is received, an electric heater circuit being also attached and Fig. 5 is a modified arrangement showing another embodiment of this invention in which a gas burner is used as a heater for the sealed vessel.

Referring to Fig. 1, 1 represents a sealed vessel in which a liquid heating medium 2 having a high boiling point at 1 atmospheric pressure and its vapor 3 are simultaneously enclosed, the air formerly existing in the vessel being exhausted through a hole which is thereafter hermetically sealed. A tube 4, through which the substance to be heated at a high temperature passes, extends through the sealed vessel 1. It is of course understood that junctures of the wall of the sealed vessel 1 and the wall of the tube 4 are hermetically sealed. An electric heater 5 is wound around the sealed vessel 1. The vessel 1 and the outer part of the tube 4 are covered by any suitable heat insulation material 6.

In accordance with this invention, one end of a fine pipe 8 opens into the inside of the sealed vessel 1 through the wall of the latter where such wall is immersed in the liquid heating medium, for instance, at the bottom 7. The other end of the fine pipe 8 is extended through the heat insulation material 6 to the outerside thereof and opens into an elastic bellows 9. The fine pipe 8 and the elastic bellows 9 are also filled with liquid heating medium 2′ which is taken from the liquid heating medium 2 in the sealed vessel 1. The thickness and length of the fine pipe 8 are so selected that the quantity of heat conducted from the sealed vessel 1 to the elastic bellows is small and the thin metallic plates forming the elastic bellows are not aged and so that the temperature of the elastic bellows is maintained lower than the temperature at which the welding flux interconnecting the metallic plates melts.

Mounted on the free end of the elastic bellows 9 is a piece 10 acting upon a movable electric contact 11 which cooperates with a fixed contact 12. The contacts 11 and 12 and the electric heater 5 are connected in series through lead wires 13 with regard to an electric source 14.

Fig. 2 shows the details of the elastic bellows 9 which is composed of a plurality of annular elements of thin elastic plates welded together at their adjacent edges 16.

The operation of the above arrangement embodying this invention is as follows:

The positions of the contacts 11 and 12 with regard to the piece 10 of the elastic bellows are adjusted corresponding to the predetermined temperature. When owing to heat dispersion, the temperature of the sealed vessel 1 tends to decrease, then some of the vapor in the vessel 1 is condensed to the liquid state with the result that the pressure in the sealed vessel 1 is substantially reduced. This pressure change is transmitted through liquid heating medium 2′ in the fine pipe 8 to the liquid heating medium in the elastic bellows 9 which thereby contracts and correspondingly displaces the piece 10. This causes the contact 11, owing to its own elastic property, to engage the contact 12 and the electric heater 5 is energized by the current passing through the contacts to vaporize the liquid heating medium 2.

If the temperature of the sealed vessel, on the contrary, rises to more than the predetermined value, some of the liquid heating medium 2 in the sealed vessel 1 vaporizes to increase the vapor pressure which is transmitted to the liquid heating medium 2 and 2′ to elongate the elastic bellows 9. Then the contact 11 separates from the contact 12 to cut off the current passing through the heater.

Thus according to this invention, even if the sealed vessel 1 is affected by the outer temperature, the temperature in the sealed vessel can always be maintained at a predetermined value by the sensitive operation above described. Accordingly, the substance passing through the tube 4 is heated at the predetermined temperature. In this case, there is no appreciable heat flow between the liquid heating medium in the fine pipe 8 and that in the sealed vessel 1 so that the liquid heating medium 2′ in the elastic bellows 9 can be maintained at a low temperature in spite of the high temperature in the sealed vessel 1. Thus the pressure variation occurring in the sealed vessel 1 can be transmitted to the elastic bellows without encountering the disadvantage that the elastic property of the elastic bellows is dulled or the welding flux interconnecting the elastic plates is melted.

The above arrangement is adapted for heating viscous material 17 such as melted nylon-chip used in the production of synthetic fiber. In this case, a multitude of fine nozzles are formed at the lower end of the tube 4 through which the viscous material is extruded by adequate pressure. The viscous material in the tube 4 is heated and maintained at a constant high temperature such as 240° C. during movement and exhausted out of the nozzles to form fibers 18 in good condition in which the viscosity of the material is very suitable for the production of synthetic fiber. A suitable liquid heating medium for use in the vessel 1, when a high temperature is desired in the latter, is the material known as Dowtherm "A" which is composed of 73.5% diphenyle oxide and 26.5% diphenyle, having the chemical formula $$(C_6H_5)_2O—(C_6H_5)_2$$

and a boiling point of 257.4° C. at a pressure of one atmosphere.

The heating apparatus having Dowtherm "A" and its vapor enclosed in the sealed vessel 1 thereof will have a characteristic curve representing the relation between the boiling temperature of the heating medium and the pressure in the sealed vessel. Since the bellows 9 is elongated in proportion to the pressure in vessel 1, the pressure corresponding to the desired constant temperature, for example, a constant temperature of 240° C., can be estimated from the characteristic curve, and the contacts 11 and 12, which are preferably adjustably mounted, are then positioned with respect to the bellows 9 so that the rod 10, actuated by the latter, engages the movable contact 11 when the bellows expands to the condition corresponding to the desired temperature within vessel 1.

If a lower constant temperature is desired, for example, a temperature of 160° C., the material known as Dowtherm "E," having the chemical formula of $C_6H_4Cl_2$ and a boiling point of 178° C. at a pressure of one atmosphere, is suitable for use as the heating medium within the sealed vessel 1. Thus, it is apparent that the heating medium employed should have a boiling point, at a pressure of one atmosphere, which is comparatively close to the desired constant temperature to be maintained in sealed vessel.

Fig. 3 illustrates another embodiment of this invention. In this arrangement, the sealed vessel 1 is enclosed in a tubular passage 4 through which the substance to be heated passes and the electric heater 5 is immersed in the liquid heating medium 2. The lead wires 13 are inserted through the walls of the sealed vessel and the tubular passage, and the sealed vessel is electrically insulated from the tubular passage by any suitable means known to those skilled in the art.

Fig. 4 shows a modified arrangement in which the lower end of the tubular receptacle 4 having the substance to be heated therein is inserted into the sealed vessel 1. The other arrangements and connections are similar to those of the heating apparatus as shown in Fig. 1. The operation of the arrangements shown in Figs. 3 and 4 is analogous to that explained in connection with the example shown in Fig. 1, so that in Figs. 3 and 4 the same reference characters are used to designate similar parts and further explanation is omitted for the sake of simplicity.

Fig. 5 shows another modified arrangement in which the electric heater shown in the arrangements of Figs. 1, 3 and 4 is replaced by a gas burner for heating the liquid heating medium 2 in the sealed vessel 1. In this arrangement, the gas burner 19 is placed under the sealed vessel 1 and fed with gas and an adequate quantity of air through a feed pipe 20 which extends from a chamber 21. The chamber is connected to a gas pipe 22 and is provided with an adjusting hole 23 through which an adequate quantity of air is fed. The gas pipe 22 has a main valve 24 which is operated electromagnetically. Parallel to the main valve 24, a manually operating valve 26 is provided in a by-pass 25. The main valve 24 is controlled by an operating coil 27 which is connected to the electric source 14 in series with the contacts 11 and 12 which are controlled by the elastic bellows 9 as shown and described in connection with the previous embodiments. An exhaust flue 29 for the exhaust gas is disposed around the vessel 1.

The heating operation of the arrangement shown in Fig. 5 is as follows:

First, the manually operating valve 26 is always opened for supplying an adequate amount of gas from the supply source 30 through the by-pass 25 to the gas burner 19. However, the gas passed through the bypass 25 is less than that required to obtain the predetermined temperature in the vessel 1.

For the purpose of obtaining the predetermined high temperature in the sealed vessel 1, the main valve 24 is now opened by energizing of the operating coil 27 through the contacts 11 and 12 which are closed by the elastic bellows 9. Then a large enough amount of gas is fed to the gas burner 19 to heat the heating medium in the sealed vessel to the predetermined temperature.

When this temperature is obtained, the elastic bellows is elongated to open the contacts 11 and 12, thereby closing the main valve 24 to cause the burning of gas passing through the by-pass 25 only. Accordingly, it is noted that the gas passing through the by-pass 25 is mainly for the purpose of maintaining the ignition at the burner 19 while the valve 24 is automatically controlled to regulate the temperature in vessel 1.

The above described heating apparatus according to this invention are advantageous for heating any desired substance at a predetermined high temperature such as, for example, the heating of nylon-chip in synthetic fiber production, of extruders in wire insulation industry, of vinyl calenders in vinyl sheet production, of chemical substance in various chemical reactions and of metals or other material in case of heat treatment.

It is to be understood that this invention is not limited to any specific constructon disclosed herein, or otherwise than by the appended claims.

What is claimed is:

1. A heating apparatus comprising in combination a hermetically sealed vessel having a liquid heating medium and the vapor thereof exclusively enclosed therein, a receptacle for the substance to be heated disposed in thermal relation with said sealed vessel, a fine pipe one end of which opens into said sealed vessel through the wall of the latter below the level of said liquid heating medium, an elastic bellows disposed externally of said sealed vessel and communicating with the other end of said fine pipe, said fine pipe and said elastic bellows being filled with liquid heating medium from said sealed vessel, a heating means for heating said sealed vessel and thermally coupled to the substance to be heated by the liquid heating medium, the thickness and length of said fine pipe being such that the high temperatures occurring in said sealed vessel are prevented from being communicated to said elastic bellows to the extent causing injury to the latter, a pair of electric contacts which is operated by said elastic bellows for controlling said heating means, and means adjustably supporting said electric contacts so that the position of the latter may be varied with respect to the free end of said bellows to permit the maintenance of the temperature in said sealed vessel at any desired value, the pressure in said sealed vessel being transmitted through the liquid medium in said fine pipe to said elastic bellows.

2. A heating apparatus comprising in combination a hermetically sealed vessel having a liquid heating medium and the vapor thereof exclusively enclosed therein, a tubular receptacle extending through said sealed vessel for the passage therethrough of the substance to be heated, a fine pipe one end of which opens into said sealed vessel through the wall of the latter below the level of said liquid heating medium, an elastic bellows communicating with the other end of said fine pipe and disposed externally of said sealed vessel, said fine pipe and said elastic bellows being filled with liquid heating medium from said sealed vessel, an electric heater surrounding said sealed vessel and thermally coupled to the substance to be heated by the liquid heating medium, the thickness and length of said fine pipe being such that the high temperatures occurring in said sealed vessel are prevented from being communicated to said bellows to the extent causing injury to the latter, electric contacts operated by said elastic bellows for controlling said electric heater, and means adjustably mounting said electric contacts so that the position of the latter with respect to the free end of said bellows may be varied to permit the maintenance of the temperature in said sealed vessel to any desired value, the pressure in said sealed vessel being transmitted through the liquid medium in said fine pipe to said elastic bellows.

3. A heating apparatus comprising in combination a hermetically sealed vessel having a liquid heating medium and the vapor thereof exclusively enclosed therein, a receptacle surrounding said sealed vessel for containing the substance to be heated, a fine pipe one end of which opens into said sealed vessel through the wall of the latter below the level of said liquid heating medium, an elastic bellows communicating with the other end of said fine pipe and disposed externally of said sealed vessel, said fine pipe and said elastic bellows being filled with liquid heating medium from said sealed vessel, an electric heater immersed in the liquid heating medium of said sealed vessel and thermally coupled to the substance to be heated by the liquid heating medium the thickness and length of said fine pipe being such that the high temperatures occurring in said sealed vessel are prevented from being communicated to said elastic bellows to the extent causing injury to the latter, a pair of electric contacts which is operated by said elastic bellows for controlling said electric heater, and means adjustably mounting said electric contacts to permit varying of the position of the latter with respect to the free end of said elastic bellows whereby the temperature in said sealed vessel may be maintained at any desired constant value, the pressure in said sealed vessel being transmitted through the liquid medium in said fine pipe to said elastic bellows.

4. A heating apparatus comprising in combination a hermetically sealed vessel having a liquid heating medium and the vapor thereof exclusively enclosed therein, a receptacle extending into said sealed vessel for containing the substance to be heated, a fine pipe one end of which opens into said sealed vessel through the wall of the latter below the level of said liquid heating medium, an elastic bellows communicating with the other end of said fine pipe and disposed externally of said sealed vessel, said fine pipe and said elastic bellows being filled with liquid heating medium from said sealed vessel, an electric heater which surrounds said sealed vessel and thermally coupled to the substance to be heated by the liquid heating medium, the thickness and length of said fine pipe being such that the high temperatures occurring in said sealed vessel are prevented from being communicated to said elastic bellows to the extent causing injury to the latter, a pair of electric contacts operated by said elastic bellows for controlling said electric heater, and means for adjustably mounting said electric contacts so that the latter may be positionally varied with respect to the free end of said bellows thereby to permit the maintenance of any desired constant temperature in the sealed vessel, the pressure in said sealed vessel being transmitted through the liquid medium in said fine pipe to said elastic bellows.

5. A heating appartus comprising in combination a hermetically sealed vessel having a liquid heating medium and the vapor thereof exclusively enclosed therein, a receptacle inserted into said sealed vessel for containing the substance to be heated, a fine pipe one end of which opens into said sealed vessel through the wall of the latter below the level of said liquid heating medium, an elastic bellows communicating with the other end of said fine pipe and disposed externally of said sealed vessel, said fine pipe and said elastic bellows being filled with liquid heating medium from said sealed vessel, a gas burner for heating said sealed vessel and thermally coupled to the substance to be heated by the liquid heating medium, an operating valve for controlling the quantity of gas fed to said gas burner, an electromagnetic coil for controlling said operating valve, the thickness and length of said fine pipe being such that the high temperatures occurring in said sealed vessel are prevented from being communicated to said bellows to the extent causing injury to the latter, a pair of electric contacts operated by said elastic bellows for controlling said electromagnetic coil, and means for adjustably mounting said electric contacts to permit the varying of the position of the latter with respect to the free end of said bellows, whereby the temperature in said sealed vessel can be maintained at any desired constant value, the pressure in said sealed vessel being transmitted through the liquid medium in said fine pipe to said elastic bellows.

References Cited in the file of this patent

UNITED STATES PATENTS

| | | |
|---|---|---|
| 1,047,417 | Kercher | Dec. 17, 1912 |
| 1,780,996 | Carroll | Nov. 11, 1930 |
| 1,931,190 | Goughnour | Oct. 17, 1933 |
| 2,232,840 | Claffey | Feb. 25, 1941 |
| 2,238,318 | Goecke | Apr. 15, 1941 |
| 2,300,083 | Worthington | Oct. 27, 1942 |
| 2,454,286 | Lerner | Nov. 23, 1948 |
| 2,595,527 | Kells et al. | May 6, 1952 |
| 2,611,850 | Walton | Sept. 23, 1952 |

FOREIGN PATENTS

| | | |
|---|---|---|
| 23,767 | Denmark | Nov. 25, 1918 |
| 732,905 | Great Britain | June 29, 1955 |